US011174982B2

(12) United States Patent
Brown et al.

(10) Patent No.: US 11,174,982 B2
(45) Date of Patent: Nov. 16, 2021

(54) DEPLOYABLE PROP

(71) Applicant: River Front Services, Inc., Chantilly, VA (US)

(72) Inventors: Anthony M. Brown, Sneads Ferry, NC (US); Donald R. Brown, Oakton, VA (US); Thomas J. Harvey, Nederland, CO (US); Toby J. Harvey, Nederland, CO (US)

(73) Assignee: River Front Services, Inc., Chantilly, VA (US)

( * ) Notice: Subject to any disclaimer, the term of this patent is extended or adjusted under 35 U.S.C. 154(b) by 0 days.

(21) Appl. No.: 16/729,012

(22) Filed: Dec. 27, 2019

(65) Prior Publication Data

US 2020/0132247 A1 Apr. 30, 2020

Related U.S. Application Data

(63) Continuation of application No. 15/807,274, filed on Nov. 8, 2017, now Pat. No. 10,520,132.

(60) Provisional application No. 62/419,374, filed on Nov. 8, 2016.

(51) Int. Cl.
*F16M 11/40* (2006.01)

(52) U.S. Cl.
CPC .................................. *F16M 11/40* (2013.01)

(58) Field of Classification Search
CPC ............................. F16M 11/10; F16M 11/40
USPC ................ 248/575, 599, 615, 622, 560, 351
See application file for complete search history.

(56) References Cited

U.S. PATENT DOCUMENTS

| 2,687,866 | A | | 8/1954 | Johnson |
| 2,911,910 | A | | 11/1959 | Welsh, Jr. |
| 3,169,478 | A | | 2/1965 | Schaaf |
| 3,320,883 | A | | 5/1967 | Martin |
| 3,327,979 | A | * | 6/1967 | Akio ...................... F16M 11/40 248/166 |

(Continued)

FOREIGN PATENT DOCUMENTS

| EP | 0015067 A1 | 9/1980 |
| EP | 3538837 | 9/2019 |

(Continued)

OTHER PUBLICATIONS

"International Search Report and Written Opinion issued in International Patent Application No. PCT/US2018/047861, dated Jan. 24, 2020, filed Aug. 24, 2018", 20 pages.

(Continued)

*Primary Examiner* — Muhammad Ijaz
(74) *Attorney, Agent, or Firm* — Johnson, Marcou, Isaacs & Nix, LLC

(57) ABSTRACT

A deployable prop is provided that is capable of transitioning from an undeployed state to a deployed state in which the prop can be used to support an object against or adjacent to a structural surface. In one embodiment, the deployable prop includes a bistable "carpenter's" tape, a foot member that is engaged to one end of the tape, and a head member that is engaged to the other end of the tape. The tape, foot member, and head member can be placed in an undeployed state that has "roll" shape and in a deployed state in which the tape extends substantially linearly between the foot and head members and can be used to support an object against or adjacent to a structural surface.

32 Claims, 7 Drawing Sheets

(56) References Cited

U.S. PATENT DOCUMENTS

| | | |
|---|---|---|
| 3,374,737 A | 3/1968 | Pike |
| 3,431,574 A | 3/1969 | Mathieu |
| 3,782,284 A | 1/1974 | Gibb |
| 3,783,787 A | 1/1974 | Thornley |
| 4,015,506 A | 4/1977 | Musgrave |
| 4,408,535 A | 10/1983 | Alford |
| 4,499,828 A | 2/1985 | Honodel |
| 4,813,358 A | 3/1989 | Roberts |
| 4,856,430 A | 8/1989 | Gibb |
| 5,020,435 A | 6/1991 | Cawte |
| 6,006,671 A | 12/1999 | Yunan |
| 7,802,509 B2 | 9/2010 | Wall |
| 7,819,063 B1 | 10/2010 | Lehman |
| 7,926,423 B2 | 4/2011 | Rickman |
| 7,934,292 B2 | 5/2011 | Degner |
| 8,006,621 B1 | 8/2011 | Cherry |
| 8,194,403 B2 | 6/2012 | Liu |
| 8,267,013 B2 | 9/2012 | Moore |
| 8,826,821 B2 | 9/2014 | Martin |
| 8,904,937 B2 | 12/2014 | Mangolds |
| 9,709,213 B2 | 7/2017 | Zheng |
| 9,857,831 B2 | 1/2018 | Senatori |
| 9,909,035 B1 | 3/2018 | Caldeira |
| 2001/0055540 A1 | 12/2001 | Bonamarte |
| 2005/0092877 A1 | 5/2005 | Carnevali |
| 2005/0126420 A1 | 6/2005 | Givens |
| 2005/0179724 A1 | 8/2005 | Salt |
| 2011/0072956 A1 | 3/2011 | Wall |
| 2011/0197779 A1* | 8/2011 | Moore ............... F42B 3/087 102/331 |
| 2012/0073155 A1 | 3/2012 | Mabey |
| 2012/0074291 A1 | 3/2012 | Fu |
| 2012/0106043 A1 | 5/2012 | Murakata |
| 2012/0145027 A1 | 6/2012 | Martin |
| 2014/0048672 A1 | 2/2014 | Woodruff |
| 2015/0008302 A1* | 1/2015 | Fan .................. F16M 13/00 248/558 |
| 2015/0092427 A1 | 4/2015 | Nopper |
| 2015/0108313 A1 | 4/2015 | Leung |
| 2015/0184799 A1* | 7/2015 | Whitney ............. A47K 1/09 29/428 |
| 2015/0292672 A1 | 10/2015 | Dose |
| 2016/0134733 A1 | 5/2016 | Murphy |
| 2016/0226126 A1* | 8/2016 | Daton-Lovett ....... H01Q 1/20 |
| 2016/0286016 A1 | 9/2016 | Lee |
| 2017/0223862 A1 | 8/2017 | Justiss |
| 2018/0128419 A1* | 5/2018 | Brown ............... F16M 11/40 |
| 2019/0063892 A1 | 2/2019 | Brown |
| 2019/0103650 A1 | 4/2019 | Daton-Lovett |
| 2020/0002242 A1 | 1/2020 | Brown |
| 2020/0284570 A1 | 9/2020 | Brown |

FOREIGN PATENT DOCUMENTS

| | | |
|---|---|---|
| EP | 3538837 A1 | 9/2019 |
| EP | 3673227 | 7/2020 |
| FR | 2300325 A1 | 9/1976 |
| GB | 1415204 A | 11/1975 |
| WO | 9600879 A1 | 1/1996 |
| WO | 2008045118 A2 | 4/2008 |
| WO | 2018089530 A1 | 5/2018 |
| WO | 2019199346 A2 | 10/2019 |

OTHER PUBLICATIONS

"Ensign-Bickford Aerospace & Defense, Rapid Wall Breaching Kit, web page as of Oct. 3, 2016."

"Final Office Action issued in U.S. Appl. No. 15/807,274, filed Nov. 8, 2017", dated Apr. 11, 2019, 17 pages.

"International Preliminary Report on Patentability PCT/US2017/060685", dated May 21, 2018, 12 pages.

"International Search Report and Written Opinion PCT/US2017/060685", dated Jan. 22, 2018, 9 pages.

"Notification of Transmittal of international Preliminary Report on Patentability (Chapter II of the Patent Cooperation Treaty) and International Preliminary Report on Patentability (Chapter II of the Patent Cooperation Treaty) for PCT/US2017/060685", dated Oct. 19, 2018, 9 pages.

"Notification of Transmittal of International Preliminary Report on Patentability (Chapter II), and Communication in Cases for Which No Other Form is Applicable for PCT/US2017/060685", dated Dec. 3, 2018, 14 pages.

"Office Action issued in U.S. Appl. No. 15/807,274, filed Nov. 8, 2017", dated Aug. 27, 2018, 21 pages.

Madeira, "Invitation to Pay Additional Fees issued in International Patent Application No. PCT/US2018/047861 filed Aug. 14, 2018", dated Nov. 21, 2019, 15 pages.

U.S. Appl. No. 16/111,481 to Brown et al. filed Aug. 24, 2018.

U.S. Appl. No. 16/457,742 to Brown et al. filed Jun. 28, 2019.

"International Search Report & Written Opinion issued in PCT International Application No. PCT/US2020/033660 filed May 19, 2020", dated Sep. 15, 2020, 13 pages.

"Office Action issued in U.S. Appl. No. 16/457,742, filed Jun. 28, 2019", dated Sep. 28, 2020.

"Extended European Search Report for European Patent Application No. 17869384.2", dated Jul. 13, 2020, 8 pages.

"Gryphon Engineering Services, Gryphon Engineering I Folding Entry Prop Pole (4 Piece), web page as of Oct. 3, 2016."

"International Search Report and Written Opinion issued in International Patent Application No. PCT/US2019/039991 filed Jun. 28, 2019", dated Jun. 8, 2020, 16 pages.

Lou, et al., "A Combined Analytical and Experimental Study on Space Inflatable Booms", Aerospace Conference Proceedings, 2000, IEEE, Mar. 18-25, 2000 vol. 2, Mar. 18, 2000, 503-511.

U.S. Appl. No. 16/878,450 to Brown et al. filed May 19, 2020.

\* cited by examiner

Fig. 2A
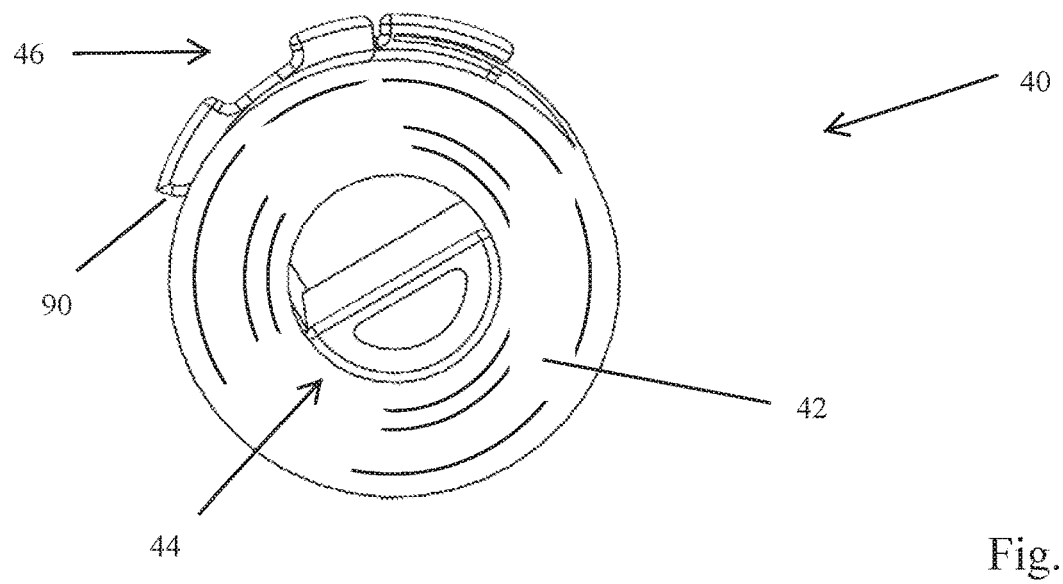
Fig. 2B
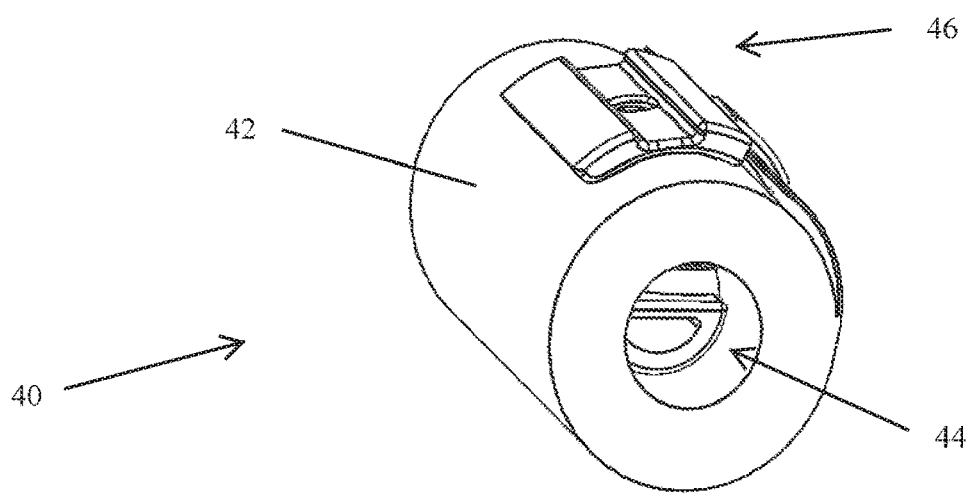
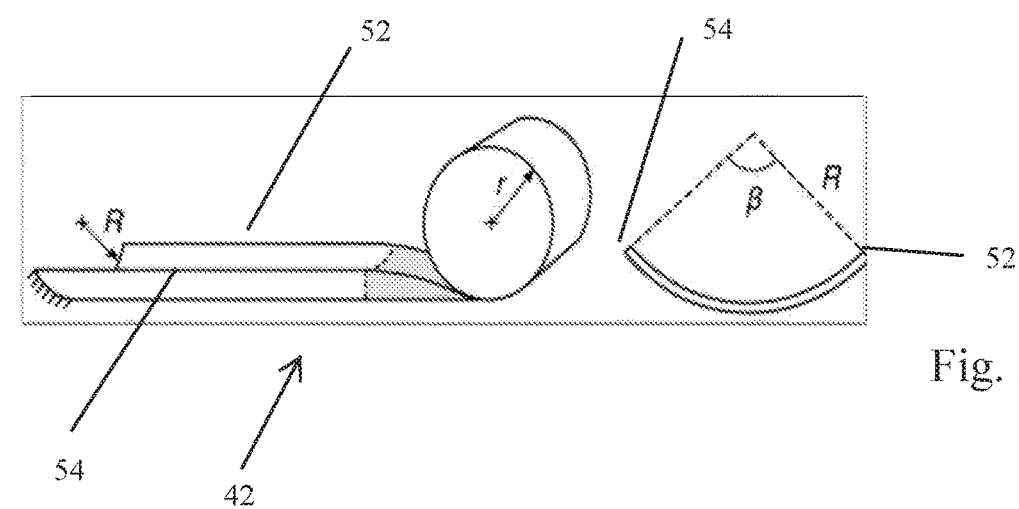
Fig. 2C

DEPLOYABLE PROP

CROSS-REFERENCE TO RELATED APPLICATIONS

The present application is a continuation of and claims priority to U.S. patent application Ser. No. 15/807,274 entitled "DEPLOYABLE PROP" and filed Nov. 8, 2017, which claims priority to U.S. provisional patent application No. 62/419,374 entitled "DEPLOYABLE PROP" and filed on Nov. 8, 2016. The entire contents of the above-identified applications are hereby fully incorporated herein by reference.

FIELD OF THE INVENTION

The invention relates to a deployable prop that is capable of transitioning from an undeployed state to a deployed state in which the prop takes on the characteristics of a column-like structure and is adapted to support an object at a desired location adjacent to a surface.

BACKGROUND OF THE INVENTION

Generally, there is a need to support an object a desired distance above ground level and against or adjacent to a vertically extending structure (e.g. door, window, wall etc.), horizontally extending structure (e.g., ceiling, roof, overhead beam etc.), or other structural surface. To address this need, props have been developed that can generally be characterized as having a foot end, head end, and a beam extending between the foot and head ends. In use, the foot end of the prop engages the ground or other supporting surface and the head end engages the object of interest that is positioned against or adjacent to a structural surface at a desired distance above the supporting surface such that, but for the support provided by the prop, the object would fall towards the supporting surface.

Various types of props have been developed. One type of prop is a fixed length prop that is made of a single-piece of wood, metal tubing, PVC pipe, or other suitable material. Characteristic of single-piece props is their fixed dimensions (typically, 1.2-1.8 m in length and 2.5-5.0 cm in diameter) and/or weight (typically, 0.5-1.0 kg). A second type of prop is a deployable prop that is adapted to transition from an undeployed state to a deployed state in which the prop is capable of supporting an object of interest against or adjacent to a structural surface. Among the second type of props are sectioned props in which each section of the prop can be joined to at least one other section, folding props that employ a shock/bungee cord to connect a number of sections of tubing to one another (i.e., a "tent pole" prop), telescoping props, and inflatable props. Sectioned and folding props each typically occupy the same or approximately the same total volume whether in the undeployed or deployed state. However, the volume occupied by such props in the undeployed state typically facilitates the use of the prop in applications in which the prop needs to be transported from one location to another location. Telescoping props and inflatable props typically occupy a smaller volume in the undeployed state than in the deployed state. This smaller volume also facilitates the use of such props in applications in which the prop needs to be transported between locations.

SUMMARY OF THE INVENTION

The invention is directed to a deployable prop that occupies a smaller volume when in the undeployed state than in the deployed state and, it is believed, has a considerably lower mass than existing props that have a comparable length in the deployed state. In one embodiment, the deployable prop comprises a tape (typically referred to as a "carpenter's tape") and one of: (a) a foot member that is operatively engaged to one end of the tape and (b) a head member that is operatively engaged to the other end of the tape. Characteristic of a carpenter's tape is that in the deployed state the tape extends linearly and has a transverse curve over the deployed length of the tape that gives the deployed tape beam-like characteristics which allow the tape to be supported at one end and extend a considerable distance to a free or unsupported end. Also characteristic of a carpenter's tape is that the tape can be rolled from one end to the other end with the rolling resulting in the transverse curve in the tape being removed as the rolling operation progresses. In the undeployed state, the tape has a rolled shape, like a roll of paper towels. In the fully deployed state, the tape extends substantially linearly between the ends of the tape. When the deployed prop is used to support an object of interest against or adjacent to a structural surface, one end of the tape and any foot member is positioned to engage a ground surface, the other end of the tape and any head member is positioned to engage the object of interest that is positioned at a desired location adjacent to a surface, and the tape extends in a substantially linear fashion between the ends of the tape. In another embodiment, the deployable prop includes a tape, a head member operatively engaged to one end of the tape, and a foot member operatively engaged to the other end of the tape.

In a particular embodiment of the deployable prop, the carpenter's tape is a bistable carpenter's tape made from a carbon fiber composite, fiberglass, or other suitable material. The two states in which the tape is stable are: (a) when substantially the entire tape is disposed in a roll (i.e., the undeployed state) and (b) when substantially the entire tape extends linearly (i.e., the deployed state). If the tape is in a state between these two stable states (i.e., a portion of the tape is rolled up and a portion of the tape extends linearly or is partially deployed), the energy stored in the tape is automatically applied to transition the tape towards one of the two stable states. Since one of the two stable states of the tape is associated with the prop being in the undeployed state, this embodiment of the deployable prop avoids the need for any kind of restraining device to maintain the tape in the rolled or undeployed state, as would be required with a carpenter's tape that is not bistable.

In another embodiment of the deployable prop, the head member is attached to an end of the tape and includes a "deployment switch," i.e., a structure that when moved to a deploy position causes a portion of the tape adjacent to head member to transition from being rolled to being straight. In an embodiment that employs a bistable tape, this transition of the portion of tape adjacent to the head member from being rolled to being straight places the tape in or near an unstable state that causes the tape to self-deploy towards the stable state in which the tape is fully deployed, i.e., extends substantially linearly throughout the entire length of the tape.

In yet a further embodiment of the deployable prop, the head member includes a "cap" structure that operatively covers the end of the tape to which head member is attached, thereby preventing the end of the tape from being engaged by other structures (e.g., the object of interest or the structure adjacent to which the object is being supported by the prop) in a manner that could apply a force to the tape which could potentially compromise the structural integrity of the tape when the prop is in the deployed state. In yet a further embodiment, the head member includes a cap structure that prevents undesired contact with other structures and supports the end of the tape in a manner that prevents the end of the tape from being deformed, i.e., preventing the transverse curve associated with the end of the tape from being deformed and potentially compromising the integrity of the tape.

In another embodiment of the deployable prop, the foot member includes a structure with a partially cylindrical surface that allows the prop to be positioned at different angles to the ground surface. Further, in a specific embodiment, the cylindrical surface facilitates the placement of the prop in the undeployed state by having a radius that is slightly smaller than the radius of the innermost winding of the tape. As such, the tape can be readily wound around the foot member to place the prop in the undeployed state.

In yet a further embodiment of the deployable prop, the foot member supports the tape such that the neutral axis of the deployed tape intersects the centroid/center of mass of the foot member. This increases the strength of the prop, i.e., increases the mass that can be supported by the deployed prop.

Another embodiment of the deployable prop, the foot member includes a tape stabilizer that engages the interior side of the end of the tape to which the foot member is attached and serves to support the deployed tape in a manner that prevents rotation of the deployed tape about its long axis, which could compromise the integrity of the tape.

In a further embodiment of the deployable prop, the lateral edges of the tape are covered in a sheath of tape or elastomeric material that is capable of accommodating the change in shape of the tape between the undeployed and deployed states. The sheath prevents the small slivers of material that are shed by some tape materials (e.g., carbon fiber) from penetrating a user's hand. In some embodiments, the tape or elastomeric material sheaths the lateral edges of the tape and top and bottom surfaces of the tape that extend between the lateral edges of the tape. In another embodiment, the tape or elastomeric material covers the end edges of the tape. In this embodiment, the tape or elastomer covering the end edges also forms head and/or foot members of the deployable prop. In this embodiment, the tape or elastomer has sufficient frictional properties to engage at least certain ground surfaces and certain objects so that the object can be supported as desired location against or adjacent to a surface. In one embodiment, a liquid elastomer is applied to an end of the tape (e.g., by dipping) and allowed to cure to form the head or foot member of the prop. If needed or desired, multiple coatings of the elastomer can be applied to an end of the tape to build up the bulk of the head or foot member.

Also provided is a method of supporting an object of interest adjacent to or against a structural surface with a prop. The method includes providing a deployable prop that includes a carpenter's tape in a rolled or undeployed state, causing the carpenter's tape to deploy such that the tape extends linearly from the first terminal end of the tape to the second terminal end of the tape, positioning the first end of the tape so as to operatively engage a ground surface, and positioning the second end of the tape so as to operatively engage the object of interest where the object of interest is positioned at a desired location against or adjacent to a surface. Use of the method results in the tape extending between the ground surface and the object of interest such that the object of interest is held in a stable position adjacent to or against a structural surface. In one embodiment, the method employs a deployable prop that includes foot and head members that are respectively attached to opposite ends of the tape so as to form an integrated structure that can be placed in an undeployed state characterized by the tape being in a rolled state. In another embodiment, one or both of the foot and head members is/are attached to the tape after deployment, thereby allowing the foot and/or head members that accommodate particular applications to be attached to the tape. In yet a further embodiment, the deployable prop does not employ a head member because the object of interest is adapted or has been adapted to receive an end of the tape and support the tape in a desired manner. In another embodiment of the method, the deployable prop does not employ a foot member because the ground surface that will support the prop may sufficiently support the prop without the need for a foot member. For example, a firm "mud" may support the tape the desired manner. One application in which the deployable prop is utilized is as a prop to support an explosive charge against a surface in which it is desirable to establish a breach.

BRIEF DESCRIPTION OF THE DRAWINGS

FIGS. 2A and 2B respectively are a side view and a perspective view of a second embodiment of a deployable prop;

FIG. 2C illustrates the bistable "carpenter's" tape employed in the embodiment of the deployable prop shown in FIGS. 2A and 2B in a partially deployed and partially undeployed state and the transverse curve associated with the deployed state of the tape;

DETAILED DESCRIPTION

Figure 1:
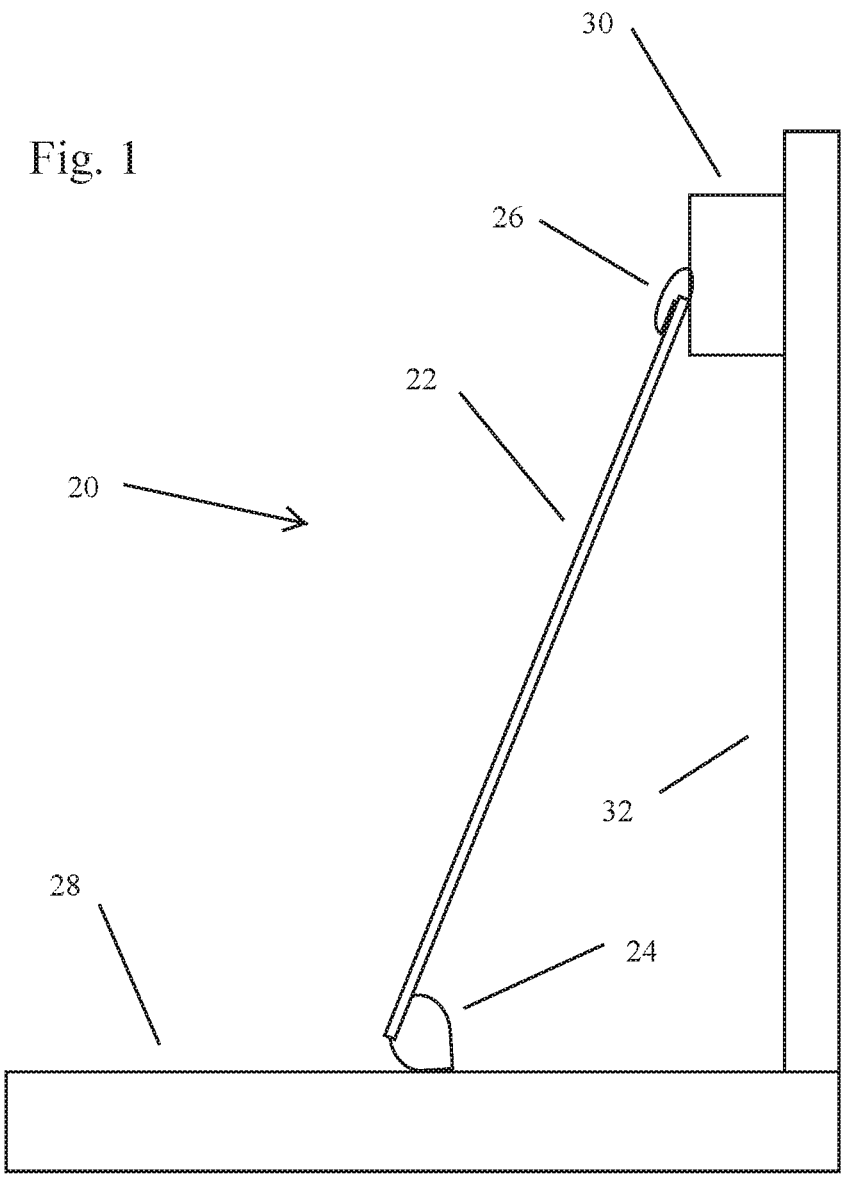
FIG. 1 is a schematic view of an embodiment of a deployable prop in a deployed state and supporting an object against a wall.

With reference to FIG. 1, an embodiment of a deployable prop 20 is described. Generally, the deployable prop 20 comprises a tape 22, a foot member 24, and a head member 26. The tape 22 is capable of being placed in a deployed state and an undeployed state. Characteristic of the deployed state is that the tape extends linearly between its terminal ends and has a transverse curve between its lateral edges over substantially the entire length of the deployed tape. Characteristic of the undeployed tape is that the tape is disposed in an Archimedean spiral that extends between its terminal ends and there is substantially no transverse curve between the lateral edges of the tape. It should be appreciated that the tape can be placed in other undeployed states. For instance, the tape can be disposed so as to follow a serpentine path. However, characteristics of any undeployed state is that the terminal ends of the tape are closer to one another in the undeployed state than in the deployed state. In operation, the deployable prop 20 is transitioned from the undeployed state to the deployed state, the foot member 24 is placed into contact with a ground surface 28, and the head member 26 is positioned to contact with the object 30 so as to support the object at a desired location adjacent to a vertically extending surface 32. It should be appreciated that the ground surface 28 and vertically extending surface 32 need not be perpendicular to one another and need not be planar surfaces.

With reference to FIGS. 2A-2I, a second embodiment of a deployable prop 40 is described. The prop 40 includes a tape 42, a foot member 44, and a head member 46. In the illustrated embodiment, the tape 42 is a bistable "carpenter's" tape that has two stable states, a deployed state and an undeployed state. Characteristic of the deployed state is that the tape 42 extends substantially linearly from a first terminal end 48 to a second terminal end 50. In the illustrated embodiment, the length of the tape (i.e., distance from the first terminal end 48 to the second terminal end 50) is 5 ft. or about 1.52 m. A tape with greater or lesser length depending on the application and other physical characteristics of the prop is feasible. Also characteristic of the deployed state is that the tape 42 has a transverse curve between a first lateral edge 52 and a second lateral edge 54 that is present over substantially the entire length of the tape. The transverse curve in the illustrated embodiment is a circular curve that has an angular extent of about 265°. The transverse curve can have a greater or lesser angular extent depending on the application and other physical characteristics of the prop is feasible. In the deployed state, the tape takes on the characteristics of a beam. Characteristic of the undeployed state is that the tape 42 is disposed in a roll (Archimedean spiral) in which the transverse curve present in the deployed state is no longer present. In the undeployed state, the width of the tape (i.e., the perpendicular distance between the first lateral edge 52 and the second lateral edge 54) is 2.5 inches or about 6.35 cm. A tape with greater or lesser width depending on the application and other physical characteristics of the prop is feasible is feasible. Characteristic of the bistable nature of the tape 42 is that, if the tape is in a state that is between the deployed and undeployed states, potential energy stored in the tape is applied and causes the tape to transition towards one of the two stable states. In the illustrated embodiment, the bistable carpenter's tape 42 is designed so that if a substantial portion of the tape is in the undeployed state and a small portion of tape adjacent the outermost terminal end of the tape is placed in a deployed tape, the tape transitions towards the deployed state. In the illustrated embodiment, the bistable carpenter's tape 42 is made from carbon fiber. However, bistable carpenter's tapes can also be made from fiberglass, Kevlar™ fiber, or other composite materials. Bistable tapes are well known in the art and can be obtained from various manufacturers with the desired physical characteristics (e.g., length, width, angular extent of transverse curve, and point/range over which the tape will transition towards one of the two stable states etc.). Among these manufacturers are RTL Materials Ltd., LoadPath, and Roccor, Inc.

Figure 2D:
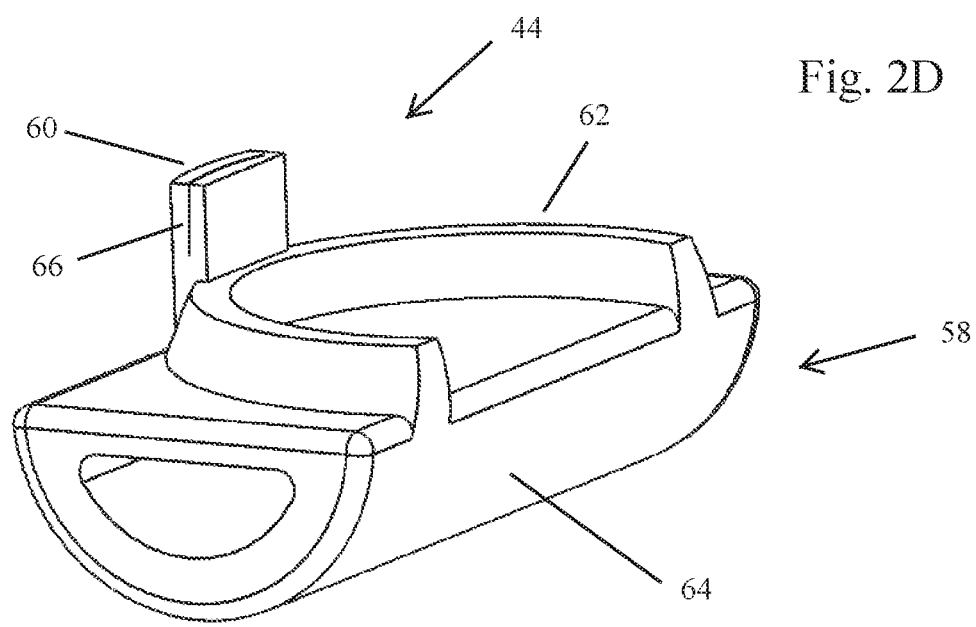
FIG. 2D is a perspective view of the foot member of the embodiment of the deployable prop shown in FIGS. 2A and 2B.
Figure 2E:
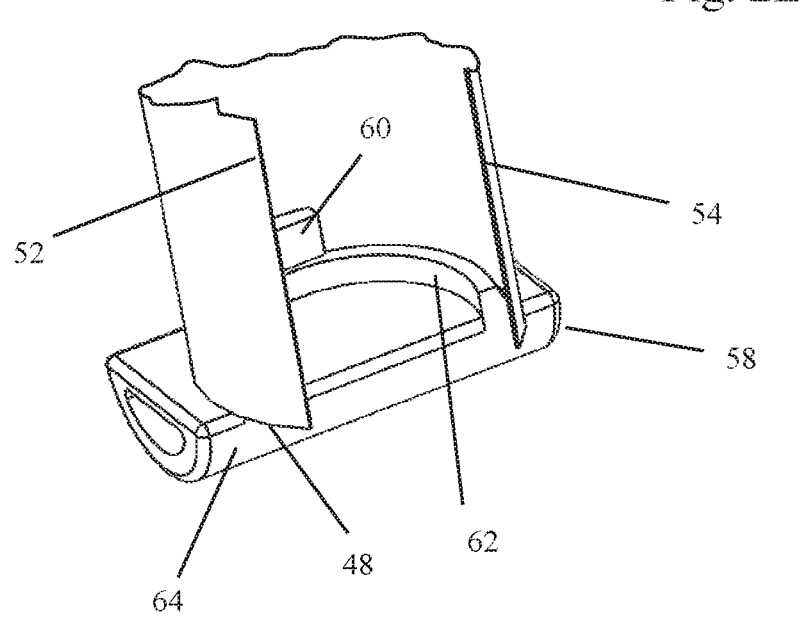
FIG. 2E is a perspective view of the foot member and the tape of the embodiment of the deployable prop shown in FIGS. 2A and 2B when the portion of the tape engaging the foot member is in a deployed state.

With reference to FIGS. 2D and 2E, the foot member 44 comprises a ground engagement portion 58, an attachment tab 60, and a tape stabilizer portion 62. The ground engagement portion 58 has an outer surface 64 that has a partial-cylinder shape. The partial-cylinder shape, when in contact with flat ground, ensures that a portion of the ground engagement portion 58 is in contact with the ground over a substantial range of angles that the deployable prop might have relative to the ground. It should be appreciated that the ground does not necessarily need to be flat for the ground engagement portion 58 of the deployable prop to function. Further, it should also be appreciated that the "ground" need not be a horizontal surface but can be any surface that allows the deployable prop 40, when deployed, to hold an object against or adjacent to another surface. The ground engagement portion 58 is also preferably made of a thermoplastic elastomer that has a relatively high coefficient of friction that prevents slippage between the ground engagement portion 58 and the ground when the deployed prop is supporting an object adjacent to or against a surface. Materials with sufficient coefficients of friction other than a thermoplastic elastomer are also feasible.

The attachment tab 60 is operatively attached to ground engagement portion 58 and tape stabilizer portion 62 of the foot member 44 and has a slit 66 for receiving a portion of the first terminal end 48 of the tape 42. A bonding material is used to engage the attachment tab 60 and the tape 42 to one another. The attachment tab 60 is flexible so as to conform to the shape of the tape 42 when the tape is in the deployed and undeployed states. In the illustrated embodiment, the attachment tab 60 is made of a thermoplastic elastomer. Other materials that accommodate the change in shape of the tape 42 between the undeployed and deployed states are feasible. Further, the bonding material used to connect the attachment tab 60 and tape 42 to one another accommodates the change in the shape of the portion of the tape 42 engaged by the attachment tab 60 when the tape transitions between undeployed and deployed states.

The tape stabilizer 62 is operatively attached to the ground engagement portion 58 and attachment tab 60 and operates so as to engage the interior surface side of the tape adjacent to the first terminal end 48 of the tape 42 when the tape is in the deployed state. The tape stabilizer 62 prevents the cross-section of the tape 42 at the end of the tape from deforming while under load. The tape stabilizer 62 is made of a thermoplastic elastomer. However, the tape stabilizer can be made of other materials.

In the illustrated embodiment, the foot member 44 is a monolithic structure made from a thermoplastic elastomer and formed by casting, molding, 3D printing, or other method known to those in the art. As such, the ground engagement portion 58, attachment tab 60, and tape stabilizer portion 62 are all made from the same thermoplastic elastomer. The foot member can be formed from multiple pieces that are operatively joined to one another and/or from different materials, if needed or desired. For example, the ground engagement portion 58 can be a two-piece structure, a substrate and a partially cylindrical coating of a material with a suitable coefficient of friction. Further, because the tape stabilizer portion 62 does not need to accommodate changes in the shape of the tape between the undeployed and deployed states, the tape stabilizer portion 62 can be made of a material with a low coefficient of friction (e.g., a plastic or a metal) and fastened or bonded to the ground engagement portion 58.

Substantially the entire foot member 44 (other than a small portion of the attachment tab) is disposed within an inner space defined by the tape 42 when the tape is in the undeployed state. In this regard, the partial-cylinder shape of the outer surface of the ground engagement portion 58 has a radius that is slightly less than the inner radius of the Archimedean spiral defined by the tape 42 when the tape is in the undeployed state. Further, the tape stabilizer 62 is attached to the ground engagement portion 58 and located substantially within the space that would be occupied by the ground engagement portion 58 if the ground engagement portion was a full cylinder. The attachment tab 60 is flexible and bends so as to accommodate the tape 42 being in the undeployed state and, as such, is also substantially disposed within the space defined by the ground engagement portion 58 if the ground engagement portion was a full cylinder. As such, the foot member 44 acts as frame around which the tape 42 can be wound when in the undeployed state.

Figure 2F:
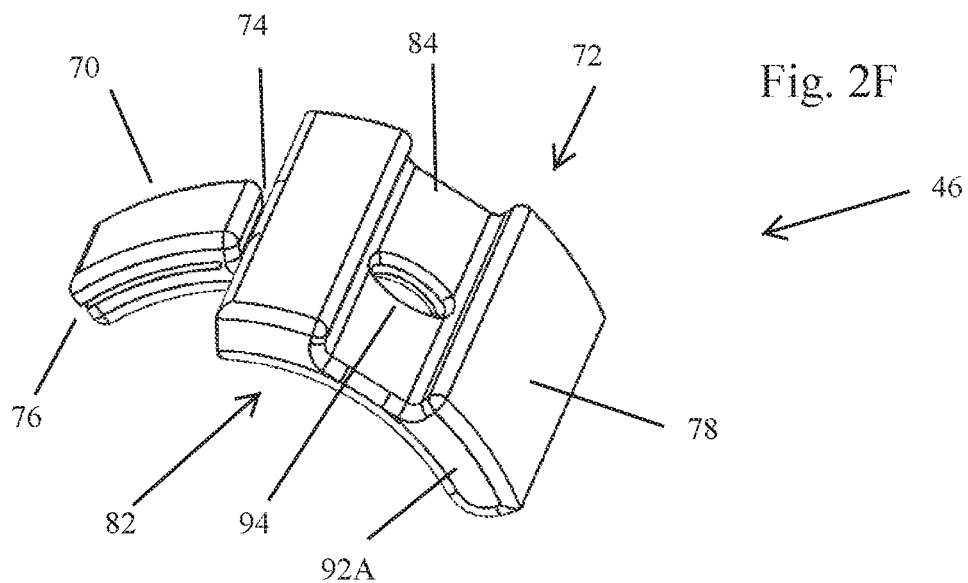
FIG. 2F is a perspective view of the outer side of the head member of the embodiment of the deployable prop shown in FIGS. 2A and 2B.
Figure 2G:
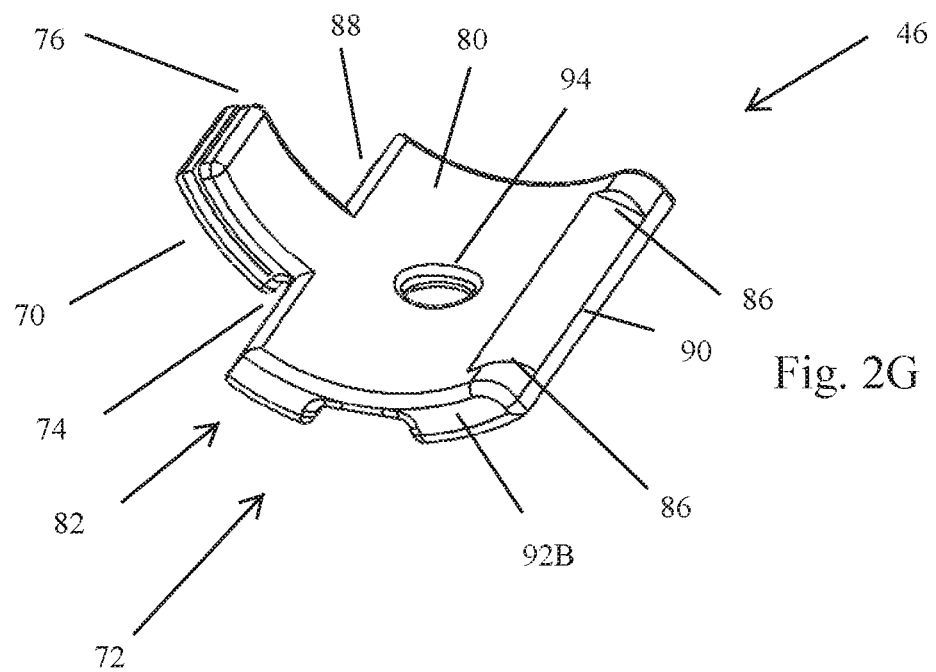
FIG. 2G is a perspective view of the inner side of the head member of the embodiment of the deployable prop shown in FIGS. 2A and 2B.

With reference to FIGS. 2F-2G, the head member 46 comprises an attachment tab 70, a cap 72, and a flex hinge 74 connecting the attachment tab and the cap. The attachment tab 70 has a slit 76 for receiving a portion of the second terminal end 50 of the tape 42. A bonding material is used to engage the attachment portion 70 and the tape 42 to one another. The attachment tab 70 is flexible so as to conform to the change in shape of the tape 42 between the deployed and undeployed states. Further, the bonding material used to connect the attachment tab 70 and tape 42 to one another accommodates the change in the shape of the portion of the tape engaged by the attachment tab when the tape transitions between undeployed and deployed states. The attachment tab 70 is also made of a thermoplastic elastomer.

Generally, the cap 72 is a cylindrical section with an outer surface 78 and an inner surface 80 that is separated from the outer surface by a side surface 82. Generally, the outer surface 78 has the shape of a cylindrical section but for a lanyard groove 84 that can accommodate a lanyard, strap, or edge of an object that may be supported by the prop 40 when deployed. Generally, the inner surface 80 has the shape of a cylindrical section with a radius that is just slightly greater than the outer radius of the tape when in the tape is in the undeployed state. Associated with the inner surface 80 is a groove 86 that is dimensioned to engage the outside surface of the second terminal end 50 of tape 42 when the tape is deployed and thereby prevent the tape from being distorted in a manner that might compromise the integrity of the tape and cause the deployed prop to fail. The side surface 82 includes a hinge surface 88 that engages the hinge 74 which connects the cap 72 and the attachment tab 70, a thumb tab surface 90 opposite the hinge surface 88, and two side edge surfaces 92A, 92B that each extend between the hinge surface 88 and the thumb tab surface 90. A hole 94 extends between the outer surface 78 and inner surface 80. The hole 94 can be used to accommodate a lanyard, strap, or other structure associated with an object to be supported by the deployed prop. It should be appreciated that, while the lanyard groove 84 and hole 94 are structures that may facilitate the ability of the deployed prop to support certain types of objects, the cap 72 can be adapted to support other structures that facilitate the ability of the deployed prop to support other types of objects. For example, the cap 72 could be adapted to accommodate a snap or barb fastener. The cap 72 is also made of a thermoplastic elastomer with a suitable coefficient friction for engaging the object that is to be supported against or adjacent to a particular surface by the prop 42. The flex hinge 74 is also made of a thermoplastic elastomer.

In the illustrated embodiment, the head member 46 is a monolithic structure made from a thermoplastic elastomer and formed by casting, molding, 3D printing, or other method known to those in the art. As such, the attachment tab 70, cap 72, and flex hinge 74 are all made from the same thermoplastic elastomer material. The head member 46 can also formed from multiple pieces that are operatively joined to one another and from different materials if needed or desired. For example, the attachment tab 70, cap 72, and flex hinge 74 can be separate pieces with the flex hinge 74 joining the attachment tab 70 to the cap 72.

With reference to FIG. 2A, when the deployable prop 40 is in the undeployed state, the head member 46 generally conforms to the outer radius of the undeployed tape 42. The attachment tab 70, cap 72, and flex hinge 74 cooperate to allow an operator to readily deploy the prop. To elaborate, an operator can initiate deployment of the prop 42 by using their thumb or other object to displace the cap 72 away from the tape 42, typically by engging the thumb tab surface 90. This displacement, in turn, causes a portion of the tape 42 adjacent to the second terminal end 50 of the tape to which the attachment tab 70 is connected to be displaced away from the remainder of the tape such that the displaced portion of the tape extends linearly and has a transverse curve. It should be appreciated that the flex hinge 74 allows the cap 72 to rotate relative to the attachment tab 70 so as to transition between the positions shown in FIG. 2H and FIG. 2I. However, the flex hinge 74 and surfaces of the attachment tab 70 and cap 72 adjacent to the flex hinge 74 prevent rotation of the cap 72 away from the second terminal end 50 of the tape beyond that shown in FIGS. 2A, 2B, and 2H. As such, the application of a user's thumb to flick the cap 72 away from the tape 42 causes a portion of the tape adjacent to the cap to deploy. Due to the bistable nature of the tape 42, the displacement of the end portion of the tape causes the remainder of the tape to self-deploy (i.e., extend linearly and have a curved transverse cross-section throughout the length of the tape) or places the tape closer to the point at which the tape will self-deploy.

Figure 2H:
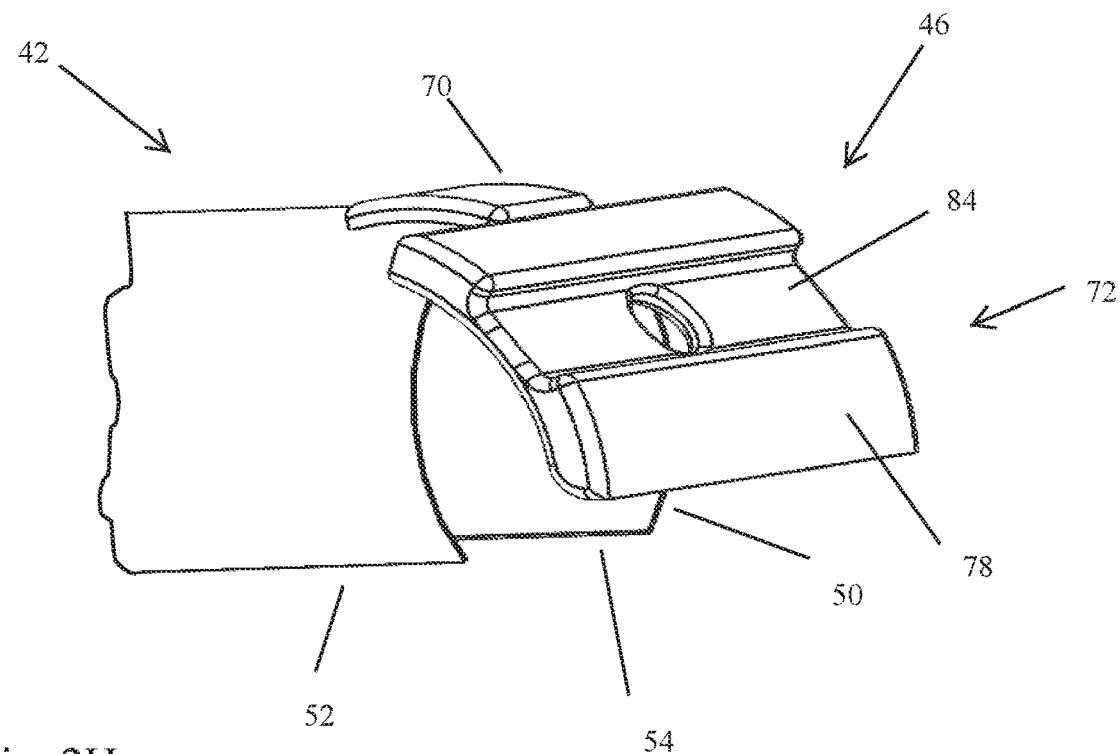
FIG. 2H is a perspective view of the tape and the head member of the embodiment of the deployable prop shown in FIGS. 2A and 2B with the cap of the head member displaced from the tape.
Figure 2I:
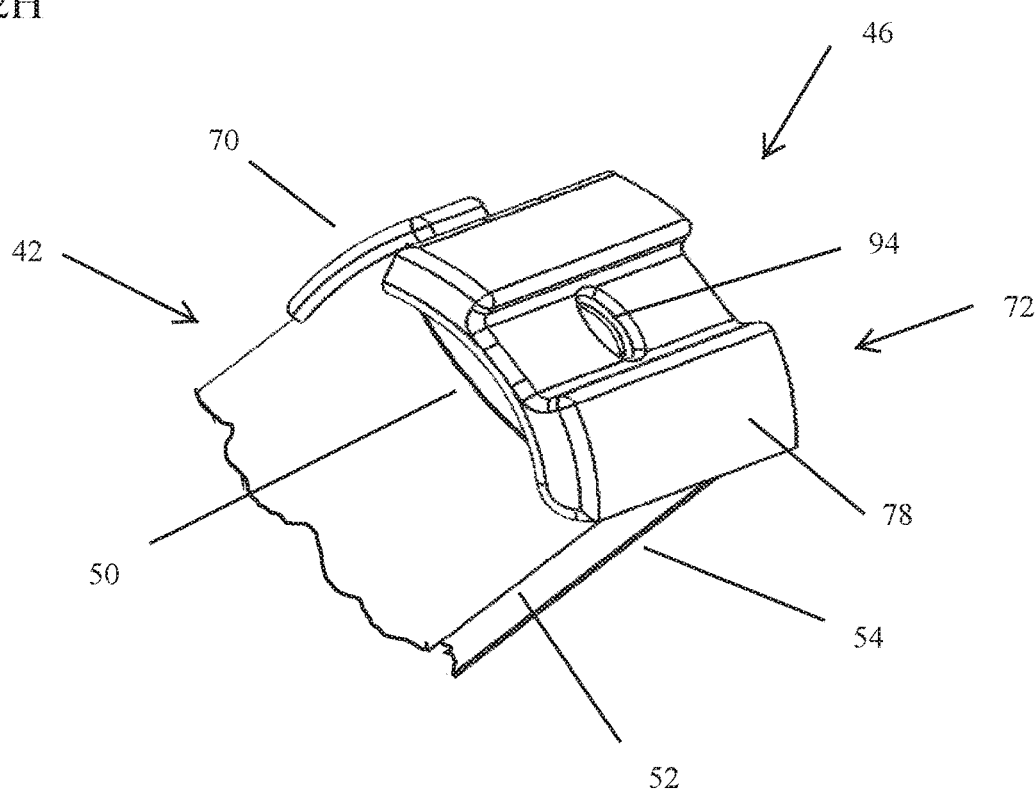
FIG. 2I is a perspective view of the tape and the head member of the embodiment of the deployable prop shown in FIGS. 2A and 2B with the cap of the head member operatively engaged to the tape.

After the tape 42 is fully deployed, the cap 72 serves a number of purposes. With reference to FIGS. 2G and 2H, the cap 72 is brought into engagement with the second terminal end 50 of the tape 42 to protect the tape from being engaged by the wall, object to be supported by the prop, or other surface in a way that could compromise the structural integrity of the tape, i.e., cause the tape to fail. Further, the groove 86 on the inner surface 80 of the cap 72 receives the second terminal end 50 of the tape and operates to maintain the shape of the tape, thereby preventing the shape of the tape from being changed in a manner that could compromise the structural integrity of the tape.

The lanyard groove 84 and/or the hole 90 may be employed to facilitate support of those types of objects that can make use of the groove and/or hole to facilitate their support, including objects with which a lanyard or strap can be associated and objects with an appropriate engagement structure (e.g., an edge that can be accommodated in the groove or dowel that can be accommodated in the hole).

Deployment of the deployable prop 40 from the undeployed state (FIG. 2A) to a deployed state commence with displacing the cap 72 away from the outermost winding of the tape 42. This can be done by using one's thumb to engage the thumb tab 90 to displace the cap 72 away from the tape. Displacement of the cap 72 away from the tape 42 causes a portion of the tape to transition to the deployed state. Due to the bistable nature of the tape 42, once a sufficient length of the tape has transitioned to the deployed state, the remainder of the tape will self-deploy. Once the tape 42 is fully deployed, the foot member 44 can be brought into engagement with a supporting surface and the cap 72 can be brought into engagement with the second terminal end 50 of the tape and the object that is to be supported against or adjacent to a surface, as shown in FIG. 1.

Figure 3A:
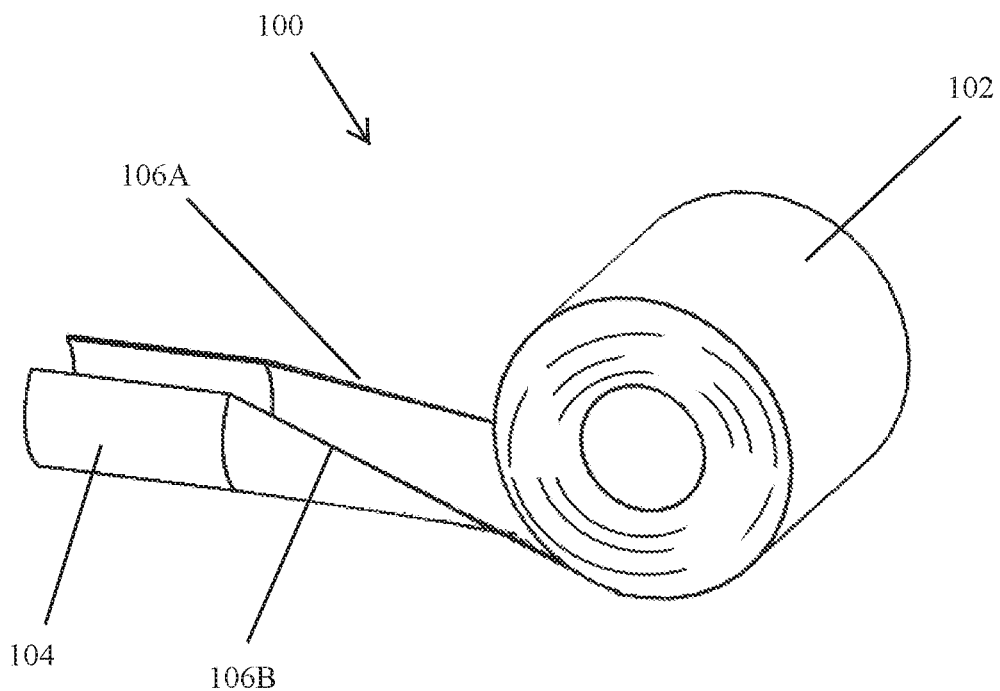
FIG. 3A illustrates a third embodiment of the deployable prop in a partially deployed state.
Figure 3B:
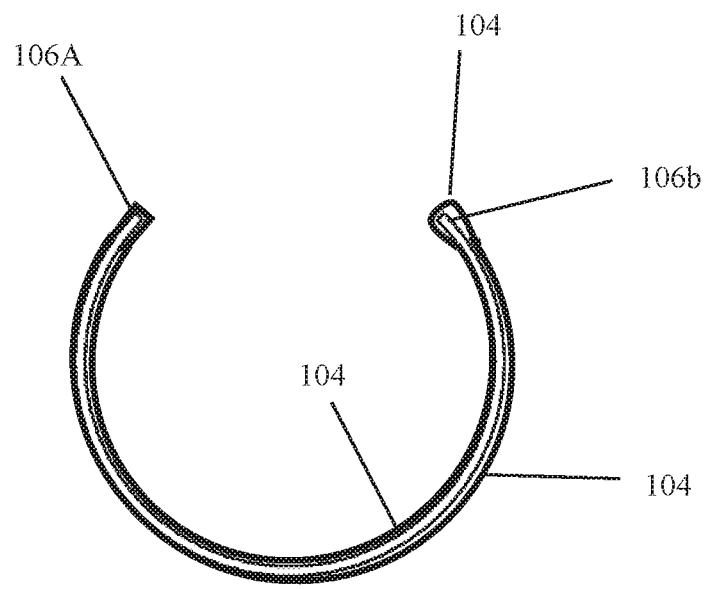
FIG. 3B is an end view of the head member of the deployable prop shown in FIG. 3A.
Figure 3C:
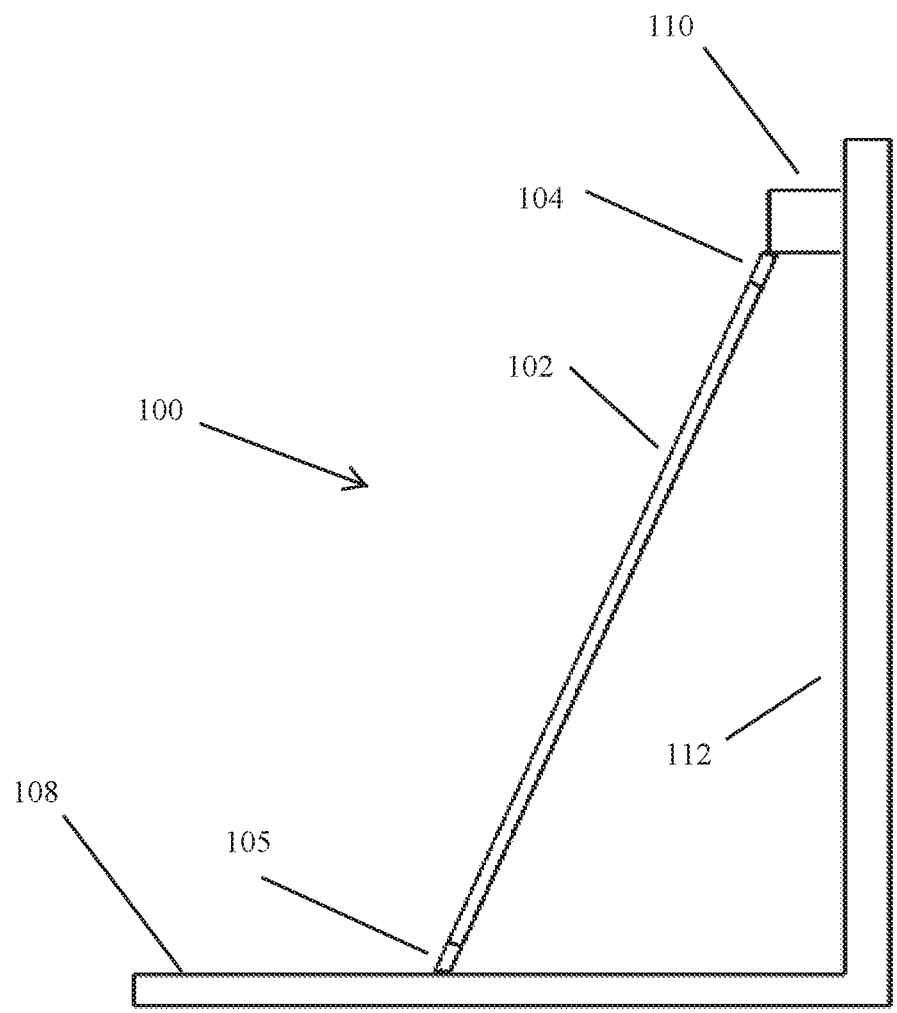
FIG. 3C illustrates an exemplary use of the deployable prop shown in FIGS. 3A and 3B.

With reference to FIGS. 3A-3C, a third embodiment of a deployable prop 100 is discussed. The prop 100 includes a tape 102, a head member 104 attached to one end of the tape, and a foot member 105 that is attached to the other end of the tape. The tape 102 is preferably a bistable tape. The head member 104 is a thermoplastic elastomer that is applied to the end of the tape by dipping, spraying, painting, or other application technique. To increase the bulk of the head member 104, multiple coats of the thermoplastic elastomer can be applied to the end of the tape. Alternatively, parachute tape (an adhesive tape with a canvas-like exterior surface that is elastic enough to accommodate the change in shape of the tape 102 between the undeployed and deployed states) can be used to realize the head member. To increase the bulk of the head member 104 multiple layers of the parachute tape can be applied. Other materials that exhibit an exterior surface with an adequate frictional properties, the ability to adhere or be adhered to the tape 102, and can accommodate the changes in shape of the tape between the undeployed and deployed states can be employed. Typically, the foot member is substantially identical to the head member 104. However, if needed or desired, the head member 104 and the foot member can be made from different materials or different combinations of materials and/or have different bulks. For example, the head member 104 can be a relatively thin layer of a thermoplastic elastomer and the foot member can be bulky structure realized with several layers of parachute tape.

As shown in FIG. 3A, the head member 104 covers portions of lateral edges 106A, 106B of the tape. Covering the lateral edges 108A, 108B has been found to be particularly beneficial when the tape 102 is made of carbon fiber or other material that has a tendency to shed small slivers of material that can penetrate a user's hand and cause substantial irritation. As such, in certain embodiments, the material used to realize the head member 104 and/or foot member is also applied so as to cover the remaining portions of the lateral edges 108A, 108B. In some embodiments in which the material that is used to cover the remaining portions of the lateral edges 108A, 108B is applied by spraying, dipping, or similar process, the entire tape 102 is covered in the material. It should be appreciated that the material used to cover the remaining portions of the lateral edges 108A, 108B or the entire tape other than the head member 104 and foot member can be a different material than the material/materials used to realize the head member 104 and foot member 105. For instance, the head member 104 and foot member may each be made from a thermoplastic elastomer and the remainder of the tape can be covered in parachute tape.

Deployment of the prop 100 from the undeployed state (in an Archimedean spiral) commences with displacing the head member 104 away from the remainder of the tape so as to cause a portion of the tape 102 to transition from the undeployed state to the deployed state. After a sufficient length of the tape 102 has transitioned to the deployed state, the bistable nature of the tape causes the remainder of the tape to self-deploy. As shown in FIG. 3C, once the prop 100 is fully deployed, the prop is positioned relative to a support surface 108, an object 110, and a vertically extending surface 112 so as to support the object at a desired location adjacent to the surface 112. With respect to the prop 100, it should be appreciated that the portion of the prop identified as the head member 104 and positioned adjacent to the outermost winding of the tape 102 when the prop is in the undeployed state could be the foot member and the head member could be positioned adjacent to the innermost winding of the tape 102 when the prop is in the undeployed state.

While the deployable prop 40 and the deployable prop 100 have been described as utilizing bistable tapes, it should be appreciated that a tape which is not bistable could be utilized. However, the use of such a tape would likely require a restraining structure to hold the tape in the undeployed state and that could be readily removed to allow the tape to deploy.

The foregoing description of the invention is intended to explain the best mode known of practicing the invention and to enable others skilled in the art to utilize the invention in various embodiments and with the various modifications required by their particular applications or uses of the invention.

What is claimed is:

1. A deployable prop to support objects adjacent to surfaces, comprising:
   a bistable tape that extends from a first terminal end to a second terminal end, wherein, when the tape is in an undeployed state, the tape is in a flat, rolled shape, and when the tape is in a deployed state, the tape extends linearly from the first terminal end to the second terminal end and a transverse curve is established by the tape between the first terminal end and the second terminal end, the tape being stable in the undeployed state and in the deployed state and being unstable when between states such that transitioning one end of the tape from the rolled shape to a linear shape places the tape in an unstable state causing the tape to self-deploy to the deployed state; and
   a head member operatively attached adjacent to the second terminal end of the tape and configured to support an explosive against a surface.

2. The deployable prop, as claimed in claim 1, further comprising a foot member comprising a tape stabilizer engaging the first terminal end of the tape to maintain a shape of the first terminal end of the tape only when the tape is in the deployed.

3. The deployable prop, as claimed in claim 2, the foot member further comprising a partially cylindrical foot member surface adapted to directly engage a ground surface, the partially cylindrical foot member surface comprising a first radius that is less than an inner radius of the tape in the undeployed, rolled state.

4. The deployable prop, as claimed in claim 3, the tape stabilizer of the foot member comprising a second radius that is less than an inner radius of the transverse curve of the tape in the deployed state.

5. The deployable prop, as claimed in claim 1, the head member comprising a tab that extends above an outermost winding of the tape when the tape is disposed in the undeployed flat, rolled shape, the tab operable to lift the head member away from the outermost winding of the flat, rolled shape to initiate transition of the tape from the undeployed state to the deployed state.

6. The deployable prop, as claimed in claim 1, the head member comprising a thermoplastic elastomer.

7. The deployable prop, as claimed in claim 1, the head member comprising an adhesive tape with an adhesive interior side and a non-adhesive exterior side, the adhesive interior side positioned between the tape and the non-adhesive exterior side.

8. The deployable prop, as claimed in claim 1, further comprising an explosive disposed adjacent to the head member.

9. The deployable prop, as claimed in claim 1, wherein the surface is a vertically extending surface.

10. The deployable prop, as claimed in claim 1, the head member comprising an attachment structure comprising a surface that engages the second terminal end of the tape, a cap, and a hinge connecting the attachment structure and the cap and allowing the cap to rotate relative to the attachment structure to contact the second terminal end of the tape.

11. The deployable prop, as claimed in claim 10, the cap comprising an interior side that engages the second terminal end of the tape, the interior side defining a groove that engages the second terminal end of the tape to maintain a shape of the second terminal of the tape when at least the portion of the tape adjacent to the head member is in a deployed state.

12. The deployable prop, as claimed in claim 1, wherein when the tape is in the undeployed state, the tape follows an Archimedean spiral with the first terminal end of the tape defining an interior end of the spiral and the second terminal end of the tape defining an exterior end of the spiral, and wherein an innermost winding of the tape has an inner radius, and an outermost winding of the tape has an outer radius.

13. The deployable prop, as claimed in claim 1, wherein when the tape is in the undeployed state, the tape follows an Archimedean spiral with the first terminal end of the tape defining an exterior end of the spiral and the second terminal end of the tape defining an interior end of the spiral, and wherein an innermost winding of the tape has an inner radius, and an outermost winding of the tape has an outer radius.

14. A method to support explosives adjacent to surfaces, comprising:
providing a tape structure comprising a bistable tape in an undeployed state in which the bistable tape is substantially disposed in a flat, rolled state, the bistable tape comprising a first terminal end and a second terminal end;
deploying the bistable tape to a deployed state in which the bistable tape extends linearly between the first and second terminal ends and comprises a transverse curve extending from the first terminal end to the second terminal end, the bistable tape being stable in the undeployed state and the deployed state and being unstable when between states such that transitioning one end of the bistable tape from the rolled shape to the linear shape places the bistable tape in an unstable state causing the bistable tape to self-deploy to the deployed state;
placing the first terminal end of the bistable tape in the deployed state adjacent to a first surface; and
placing the second terminal end of the bistable tape in the deployed state adjacent to an explosive that is to be held adjacent to a second surface.

15. The method, as claimed in claim 14, further comprising folding a cap portion of a head member attached to the second terminal end of the bistable tape to engage the cap portion with the second terminal end of the bistable tape, wherein placing the second terminal end of the bistable tape in the deployed state adjacent to the explosive comprises placing the head member adjacent to the explosive.

16. The method, as claimed in claim 14, further comprising:
engaging a stabilizer portion of a foot member attached to the first terminal end of the bistable tape with an inner radius of the transverse curve of the bistable tape in the deployed state, wherein placing the first terminal end of the bistable tape in the deployed state adjacent to the first surface comprises placing the foot member adjacent to the first surface.

17. The method, as claimed in claim 14, wherein deploying the bistable tape to the deployed state comprises manipulating a tab connected to one end of the bistable tape to initiate self-deployment of the bistable tape from the undeployed state to the deployed state.

18. A deployable prop to support objects adjacent to surfaces, comprising:
a bistable tape that extends from a first terminal end to a second terminal end, wherein, when the tape is in an undeployed state, the tape is in a flat, rolled shape, and when the tape is in a deployed state, the tape extends linearly from the first terminal end to the second terminal end and a transverse curve shape is established by the tape between the first terminal end and the second terminal end, the tape being stable in the undeployed state and in the deployed state and being unstable when between states such that transitioning one end of the tape from the rolled shape to a linear shape places the tape in an unstable state causing the tape to self-deploy to the deployed state; and
a foot member configured to engage the first terminal end of the tape and adapted to maintain the transverse curve shape of the first terminal end of the tape only when the tape is in a deployed state, the foot member further configured to engage a supporting surface.

19. The deployable prop, as claimed in claim 18, the foot member comprising a tape stabilizer having first radius that is less than an inner radius of the transverse curve shape of the tape in the deployed state to maintain the transverse curve shape of the first terminal end of the tape.

20. The deployable prop, as claimed in claim 18, further comprising a head member operatively attached to the second terminal end of the tape and configured to support an object against a surface.

21. The deployable prop, as claimed in claim 20, the head member comprising an attachment structure that engages the second terminal end of the tape, a cap, and a hinge connecting the attachment structure and the cap such that the cap is rotatable relative to the attachment structure to contact the second terminal end of the tape.

22. The deployable prop, as claimed in claim 20, wherein the object comprises an explosive.

23. The deployable prop, as claimed in claim 18, further comprising a head member operatively attached adjacent to the second terminal end of the tape and configured to support an object against a surface.

24. The deployable prop, as claimed in claim 23, the head member comprising a tab that extends above an outermost winding of the tape when the tape is disposed in the undeployed flat, rolled shape, the tab operable to lift the head member away from the outermost winding of the flat, rolled shape to initiate transition of the tape from the undeployed state to the deployed state.

25. The deployable prop, as claimed in claim 23, the head member comprising an attachment structure comprising a surface that engages the second terminal end of the tape, a cap, and a hinge connecting the attachment structure and the cap and allowing the cap to rotate relative to the attachment structure to contact the second terminal end of the tape.

26. The deployable prop, as claimed in claim 25, the cap comprising an interior side that engages the second terminal end of the tape, the interior side defining a groove that engages the second terminal end of the tape to maintain a shape of the second terminal of the tape when at least the portion of the tape adjacent to the head member is in a deployed state.

27. A deployable prop to support objects adjacent to surfaces, comprising:
   a bistable tape that extends from a first terminal end to a second terminal end, wherein, when the tape is in an undeployed state, the tape is in a flat, rolled shape, and when the tape is in a deployed state, the tape extends linearly from the first terminal end to the second terminal end and a transverse curve is established by the tape between the first terminal end and the second terminal end, the tape being stable in the undeployed state and in the deployed state and being unstable when between states such that transitioning one end of the tape from the rolled shape to a linear shape places the tape in an unstable state causing the tape to self-deploy to the deployed state;
   a head member operatively attached adjacent to the second terminal end of the tape; and
   an explosive disposed adjacent to the head member.

28. The deployable prop, as claimed in claim 27, the head member comprising a tab that extends above an outermost winding of the tape when the tape is disposed in the undeployed flat, rolled shape, the tab operable to lift the head member away from the outermost winding of the flat, rolled shape to initiate transition of the tape from the undeployed state to the deployed state.

29. The deployable prop, as claimed in claim 27, the head member comprising an attachment structure comprising a surface that engages the second terminal end of the tape, a cap, and a hinge connecting the attachment structure and the cap and allowing the cap to rotate relative to the attachment structure to contact the second terminal end of the tape.

30. The deployable prop, as claimed in claim 29, the cap comprising an interior side that engages the second terminal end of the tape, the interior side defining a groove that engages the second terminal end of the tape to maintain a shape of the second terminal of the tape when at least the portion of the tape adjacent to the head member is in a deployed state.

31. The deployable prop, as claimed in claim 27, further comprising a foot member comprising a tape stabilizer engaging the first terminal end of the tape to maintain a shape of the first terminal end of the tape only when the tape is in the deployed state.

32. The deployable prop, as claimed in claim 31, the tape stabilizer of the foot member comprising a second radius that is less than an inner radius of the transverse curve of the tape in the deployed state.

* * * * *

UNITED STATES PATENT AND TRADEMARK OFFICE
CERTIFICATE OF CORRECTION

PATENT NO. : 11,174,982 B2
APPLICATION NO. : 16/729012
DATED : November 16, 2021
INVENTOR(S) : Anthony M. Brown et al.

It is certified that error appears in the above-identified patent and that said Letters Patent is hereby corrected as shown below:

In the Claims

Column 10
Line 48, Claim 2, "is in the deployed" should read --is in the deployed state--

Column 11
Line 21, Claim 11, "second terminal" should read --second terminal end--

Signed and Sealed this
Twenty-fourth Day of May, 2022

Katherine Kelly Vidal
*Director of the United States Patent and Trademark Office*